(12) United States Patent
Inoue et al.

(10) Patent No.: US 11,918,973 B1
(45) Date of Patent: Mar. 5, 2024

(54) HEAVY METAL ADSORBENT, WATER PURIFICATION MATERIAL, AND METHOD OF MANUFACTURING HEAVY METAL ADSORBENT

(71) Applicant: SINANEN ZEOMIC CO., LTD., Nagoya (JP)

(72) Inventors: Naoyuki Inoue, Aichi (JP); Akio Taniguchi, Aichi (JP)

(73) Assignee: SINANEN ZEOMIC CO., LTD., Nagoya (JP)

( * ) Notice: Subject to any disclaimer, the term of this patent is extended or adjusted under 35 U.S.C. 154(b) by 0 days.

(21) Appl. No.: 18/018,972

(22) PCT Filed: Aug. 22, 2022

(86) PCT No.: PCT/JP2022/031501
§ 371 (c)(1),
(2) Date: Jan. 31, 2023

(51) Int. Cl.
| | | |
|---|---|---|
| *B01J 20/18* | (2006.01) | |
| *B01J 20/28* | (2006.01) | |
| *B01J 20/30* | (2006.01) | |
| *C01B 39/16* | (2006.01) | |
| *C01B 39/22* | (2006.01) | |
| *C01B 39/46* | (2006.01) | |
| *C02F 1/28* | (2023.01) | |
| *C02F 101/20* | (2006.01) | |

(52) U.S. Cl.
CPC ......... *B01J 20/18* (2013.01); *B01J 20/28004* (2013.01); *B01J 20/28016* (2013.01); *B01J 20/28071* (2013.01); *B01J 20/28083* (2013.01); *B01J 20/28085* (2013.01); *B01J 20/3085* (2013.01); *C01B 39/16* (2013.01); *C01B 39/22* (2013.01); *C01B 39/46* (2013.01); *C02F 1/281* (2013.01); *C01P 2004/61* (2013.01); *C01P 2006/14* (2013.01); *C01P 2006/16* (2013.01); *C02F 2101/20* (2013.01)

(58) Field of Classification Search
None
See application file for complete search history.

(56) References Cited

U.S. PATENT DOCUMENTS

| | | | |
|---|---|---|---|
| 2004/0089608 A1 | 5/2004 | Vo | |
| 2022/0370979 A1* | 11/2022 | De Silva | B01J 20/28071 |

FOREIGN PATENT DOCUMENTS

| | | | |
|---|---|---|---|
| BR | PI0700030 B1 * | 5/2017 | |
| CN | 105722579 A | 6/2016 | |
| CN | 107352554 A | 11/2017 | |
| CN | 109847691 A | 6/2019 | |
| JP | 55-028743 A | 2/1980 | |
| JP | 57-122932 A | 7/1982 | |
| JP | 03-295802 A | 12/1991 | |
| JP | 06-504714 A | 6/1994 | |
| JP | 2003-190942 A | 7/2003 | |
| JP | 2007-533587 A | 11/2007 | |
| JP | 2020-109369 A | 7/2020 | |
| KR | 10-2017-0036770 A | 4/2017 | |
| WO | 92/10292 A1 | 6/1992 | |
| WO | 2005/113440 A1 | 12/2005 | |
| WO | 2006/082898 A1 | 8/2006 | |
| WO | 2015/092358 A1 | 6/2015 | |
| WO | 2021/091816 A1 | 5/2021 | |

OTHER PUBLICATIONS

Machine Translation of BR PI10700030 B1 (Year: 2017).*
Office Action dated Feb. 23, 2023 in Korean Application No. 10-2022-7045906.
International Search Report of PCT/2022/031501 dated Oct. 11, 2022 [PCT/ISA/210].
Written Opinion of PCT/2022/031501 dated Oct. 11, 2022 [PCT/ISA/237].
Communication dated Oct. 17, 2023 issued by the Taiwanese Patent Office in Taiwanese application No. 111149409.

* cited by examiner

*Primary Examiner* — Sally A Merkling
*Assistant Examiner* — Michael Forrest
(74) *Attorney, Agent, or Firm* — Sughrue Mion, PLLC

(57) ABSTRACT

Provided is a heavy metal adsorbent consisting of a zeolite with a median diameter on a volume basis of 10.0 μm or more and a pore volume measured in a pore volume calculation range of 10 nm to 1000 nm by a mercury intrusion method of 0.1000 cm³/g or less.

8 Claims, No Drawings

US 11,918,973 B1

HEAVY METAL ADSORBENT, WATER PURIFICATION MATERIAL, AND METHOD OF MANUFACTURING HEAVY METAL ADSORBENT

CROSS REFERENCE TO RELATED APPLICATIONS

This application is a National Stage of International Application No. PCT/JP2022/031501, filed Aug. 22, 2022.

TECHNICAL FIELD

The present invention relates to a heavy metal adsorbent, a water purification material, and a method of manufacturing a heavy metal adsorbent.

BACKGROUND ART

PTL 1 to 3, which are expressly incorporated herein by reference in their entirety, disclose various granulated zeolites.
PTL 1: Japanese Patent Application Publication No. 2003-190942
PTL 2: Japanese Patent Application Publication No. S57-122932
PTL 3: WO 2006/082898 A1

SUMMARY OF INVENTION

In recent years, heavy metals in tap water are required to be reduced. For example, lead is one of specific examples of heavy metals in tap water. Lead pipes laid in the early 1900s as water pipes are considered the cause of lead contamination in tap water.

As a method for removing heavy metals from tap water, a method of adsorbing heavy metals on a water purifier filter has been widely used. Regarding this point, it has long been known that zeolite adsorbs heavy metal ions to remove the heavy metal ions (for example, lead ions) in water. Therefore, water purifier filters in which activated carbon filters are mixed with zeolite have recently been used to adsorb and remove heavy metal ions in tap water. However, particles in conventional zeolites are too fine to use in water and thus flow out of a purifier filter. In particular, since zeolites contain aluminum elements as the constituent elements, the outflow of fine particulate zeolites into drinkable water prepared by passing tap water through a water purifier filter may lead to contamination of aluminum elements in drinkable water, which is not preferable.

One aspect of the present invention has an object to provide a heavy metal adsorbent consisting of zeolite suitable for water purification uses.

As described above, using fine particulate zeolites in water purification uses leads to the contamination of aluminum elements into drinkable water. Therefore, a preferable grain size of a zeolite generally used by being mixed into activated carbon filters for water purifiers is considered to be 10 μm or more. Thus, it is conceivable to enlarge the grain size by granulating zeolites. Proposed methods for granulating zeolites include a method for granulating a zeolite using a binder (see PTL 1), a method for further converting the binder portion of a granulated zeolite into zeolite to form a binderless zeolite (see PTL 2), and the like. Furthermore, a method for adding a zeolite via a polymer on an activated carbon surface to produce pseudo-large particles has also been proposed (see PTL 3). However, granulated zeolites obtained in the methods mentioned above are poor in physical strength. Therefore, when a filter is produced from a mixture of activated carbon and these granulated zeolites, granules disintegrate by physical friction in a kneading process, resulting in the outflow of fine particulate zeolite particles from a water purifier filter. Also, in a filter processed under the condition with minimal physical friction, granules gradually disintegrate at contact with water in actual use, which may result in the outflow of fine particulate zeolite particles from a water purifier filter. About this point, the present inventors presume that the physical strength of grains becomes weak because many pores (for example, mesopores and/or macropores) exist in particles of granulated zeolites obtained in the methods described above, and the strength becomes further weaker because water molecules flow into the pores at the contact with water. In contrast, the present inventors have conducted intensive studies and found a novel heavy metal adsorbent consisting of the zeolite described below. The zeolite described below has a pore volume of 0.1000 $cm^3/g$ or less. The present inventors presume that this contributes to the particles being less likely to disintegrate on friction in manufacturing activated carbon filters or at contact with water, for example. However, presumptions stated in the present description do not limit the present invention.

One aspect of the present invention is as set forth below.
[1] A heavy metal adsorbent consisting of a zeolite with a median diameter on a volume basis of 10.0 μm or more and a pore volume measured in a pore volume calculation range of 10 nm to 1000 nm by a mercury intrusion method of 0.1000 cm 3/g or less.
[2] The heavy metal adsorbent according to [1], wherein a median diameter reduction rate of the zeolite after 600-second ultrasonication at an output of 40 W is 20% or less.
[3] The heavy metal adsorbent according to [1] or [2], wherein the median diameter is 20.0 μm or more and 50.0 μm or less.
[4] The heavy metal adsorbent according to any one of [1] to [3], wherein the pore volume is 0.0200 cm 3/g or less.
[5] The heavy metal adsorbent according to any one of [1] to [4], wherein the zeolite is selected from the group consisting of Type-A zeolite, Type-X zeolite, Type-Y zeolite, and Type-P zeolite.
[6] The heavy metal adsorbent according to any one of [1] to [5], wherein the zeolite is Type-X zeolite.
[7] The heavy metal adsorbent according to any one of [1] to [6], wherein the heavy metal is at least one heavy metal selected from the group consisting of lead, copper, zinc, and cadmium.
[8] The heavy metal adsorbent according to [1], wherein
  a median diameter reduction rate of the zeolite after 600-second ultrasonication at an output of 40 W is 20% or less,
  the median diameter is 20.0 μm or more and 50.0 μm or less,
  the pore volume is 0.0200 cm 3/g or less,
  the zeolite is Type-X zeolite, and
  the heavy metal is at least one heavy metal selected from the group consisting of lead, copper, zinc, and cadmium.
[9] A water purification material containing the heavy metal adsorbent according to any one of [1] to [8].
[10] A method of manufacturing a heavy metal adsorbent according to any one of [1] to [8], including:
  adding a silicon-containing compound X and an aluminum-containing compound Y to a zeolite seed crystal-containing slurry A at a temperature of 60° C. to 200° C. simultaneously or in any order, wherein the addition of X satisfies the following (1), and the addition of Y satisfies the following (2):

(1) the total addition amount of X is an amount such that the silicon element amount in X is 3.5 or more times amount of the silicon element amount in the zeolite seed crystals on a molar basis, and the addition amount of X per hour is 5.00 mol or less based on the silicon element amount in X with respect to 1 mol amount of silicon elements in the zeolite seed crystals; and (2) the total addition amount of Y is an amount such that the aluminum element amount in Y is 3.5 or more times amount of the aluminum element amount in the zeolite seed crystals on a molar basis, and the addition amount of Y per hour is 5.00 mol or less based on the aluminum element amount in Y with respect to 1 mol amount of aluminum elements in the zeolite seed crystals.

According to one aspect of the present invention, a heavy metal adsorbent consisting of zeolite suitable for water purification uses and a water purification material containing this heavy metal adsorbent. Furthermore, according to one aspect of the present invention, a method of manufacturing the heavy metal adsorbent can be provided.

DESCRIPTION OF EMBODIMENTS

[Heavy Metal Adsorbent]

One aspect of the present invention relates to a heavy metal adsorbent consisting of a zeolite with a median diameter on a volume basis of 10.0 μm or more and a pore volume measured in a pore volume calculation range of 10 nm to 1000 nm by a mercury intrusion method of 0.1000 cm3/g or less. Hereinafter, the heavy metal adsorbent will be described in more detail.

<Zeolite>

The above heavy metal adsorbent consists of a zeolite with a median diameter in the range described above and a pore volume in the range described above. Zeolites are aluminosilicate salts and may be hydrous aluminosilicate salts containing alkali metals or alkaline earth metals and constituted of rigid anionic skeletons with regular channels (tubular pores) and cavities (caves). Zeolites are classified into synthetic zeolites, such as Type-A zeolite, Type-X zeolite, Type-Y zeolite, Type-P zeolite, T-type zeolite, Type-L zeolite, β-zeolite, and ZSM-5, and natural zeolites, such as mordenite, clinoptilolite, and chabazite. The zeolite constituting the above heavy metal adsorbent may preferably be a synthetic zeolite and is preferably a zeolite selected from the group consisting of Type-A zeolite, Type-X zeolite, Type-Y zeolite, and Type-P zeolite, more preferably Type-A zeolite, Type-X zeolite, and Type-P zeolite, and more preferably Type-X zeolite.

(Median Diameter)

The "median diameter" in the present invention and the present description means a median diameter on a volume basis. The "median diameter" is also called "D50" and can be measured by a laser diffraction scattering particle size distribution measurement method. As a specific example of the measurement condition, the following measurement condition can be mentioned. The median diameters stated in the column of Examples described below are values measured by a laser diffraction scattering particle size distribution measurement method under the following measurement conditions.

Measurement apparatus: MT 3300EX11, manufactured by MicrotracBEL Corporation
Calculation mode: MT 300011
Basis: volume basis
Transmissivity: transmissive
Shape: non-spherical
Solvent: water
Particle refractive index: 1.39
Ultrasonication: output 40 W, time 120 seconds
Flow velocity: 65%

The median diameter of the above zeolite is 10.0 μm or more, preferably 15.0 μm or more, and more preferably 20.0 μm or more from the viewpoint of controlling the outflow of zeolite particles when the zeolite is applied to a water purification uses. In addition, the median diameter of the above zeolite is preferably 60.0 μm or less, more preferably 55.0 μm or less, and further preferably 50.0 μm or less from the viewpoint of the adsorption rate of heavy metals.

(Pore Volume)

The "pore volume" in the present invention and the present description is a pore volume measured in a pore volume calculation range of 10 nm to 1000 nm by a mercury intrusion method. As a specific example of the measurement condition, the measurement condition described below can be mentioned. The pore volumes stated in the column of Examples described below are values measured by a mercury intrusion method under the following measurement conditions.

Measurement apparatus: Pore Master 60-GT, manufactured by Quantachrome Instruments
Sample amount: about 0.3 to 0.4 g
Sample cell: small cell (10 φ×30 mm)
Measurement range: 20 psia to 60000 psia (10 μm to 0.0036 μm)
Pore volume calculation range: 10 to 1000 nm (0.01 μm to 1 μm)

The pore volume of the above zeolite is $0.1000$ cm$^3$/g or less. It is considered that a zeolite with a pore volume of $0.1000$ cm$^3$/g or less can have the high physical strength and show less strength deterioration at contact with water. These can contribute to reducing the outflow of zeolite particles from a water purifier filter, as described above. From such viewpoints, the pore volume of the above zeolite is preferably $0.0800$ cm$^3$/g or less, more preferably $0.0600$ cm$^3$/g or less, further preferably $0.0400$ cm$^3$/g or less, and still more preferably $0.0200$ cm$^3$/g or less. The pore volume of the above zeolite may be, for example, $0.0010$ cm$^3$/g or more, $0.0020$ cm$^3$/g or more, or $0.0030$ cm$^3$/g or more, although it is not limited to the values listed here.

(Median Diameter Reduction Rate)

Regarding zeolites, a zeolite with high strength is preferable in view of reducing the outflow of fine zeolite particles from a water purifier filter, as described above. As an index of the physical strength of zeolite, a median diameter reduction rate determined by the following method can be mentioned.

A median diameter A value under an ultrasonication-less condition and a median diameter B value after five times ultrasonication processes are respectively measured under the same conditions as the measurement conditions of the median diameter described above as a specific example, except that only the ultrasonication condition is changed to that listed in Table 1. When the A value is measured, the output of the ultrasonic wave is set to 0 W, and the flow velocity is set to 65%, as described above. When the B value is measured, ultrasonication processes are repeated five times in total under the ultrasonication condition listed in Table 1. Accordingly, the ultrasonication time is 600 seconds in total. When the B value is measured, the flow velocity is also set to 65%, as described above. From the A and B values measured, the median diameter reduction rate (unit: %) is calculated by the following expression. The median diameter reduction rate thus calculated is described as "a median diameter reduction rate after 600-second ultrasonication at an output of 40 W" or simply as "a median diameter reduction rate".

$$\text{Median diameter reduction rate}=[(A-B)/A]\times 100$$

TABLE 1

|  | Ultrasonication Condition |
| --- | --- |
| Median diameter [A] under the ultrasonication-less condition | Output 0 W (*), time: 600 seconds |
| Median diameter [B] value after five times ultrasonication | Output 40 W, time 120 seconds × 5 |

* Ultrasonication OFF

The above zeolite may show a median diameter reduction rate of 20.0% or less. Having a pore volume in the range described above may contribute to a median diameter reduction rate of 20.0% or less that the zeolite may show. The median diameter reduction rate of the above zeolite is preferably 18.0% or less, more preferably 16.0% or less, further preferably 14.0% or less, still more preferably 12.0% or less, and still further preferably 10.0% or less. In addition, the median diameter reduction rate of the above zeolite may be, for example, 0%, 0% or more, more than 0%, 0.1% or more, 0.5% or more, 1.0% or more, 2.0% or more, or 3.0% or more. The smaller the value of the median diameter reduction rate of the above zeolite, the more preferable, and 0% is the most preferable.

Examples of heavy metals that may be adsorbed by the above heavy metal adsorbent include metals with a specific gravity of 4 or more, such as lead, copper, cadmium, zinc, nickel, and mercury. In one embodiment, the above heavy metal adsorbent may be used as a lead adsorbent. For example, since reducing lead in tap water is desirable, as described above, it is preferable that the above heavy metal adsorbent functions as a lead adsorbent. In one embodiment, the above heavy metal adsorbent can function as a copper adsorbent, a zinc adsorbent, a cadmium adsorbent, and the like. In another embodiment, the above heavy metal adsorbent can function as at least one of a lead adsorbent, a copper adsorbent, a zinc adsorbent, and a cadmium adsorbent, and may function as two, three, or four of these. The above heavy metal adsorbent may be used, for example, as a component in a water purifier filter of a water purifier.

The above heavy metal adsorbent may be produced by the method of manufacturing the heavy metal adsorbent according to one aspect of the present invention, the detail of which will be described below. However, the above heavy metal adsorbent may be any heavy metal adsorbent consisting of a zeolite with a median diameter on a volume basis of 10.0 μm or more and a pore volume measured in a pore volume calculation range of 10 nm to 1000 nm by a mercury intrusion method of 0.1000 cm$^3$/g or less, and is not limited to products manufactured by such a manufacturing method.

[Water Purification Material]

One aspect of the present invention relates to a water purification material containing the above heavy metal adsorbent. Such a water purification material may only consist of the above heavy metal adsorbent or may contain the above heavy metal adsorbent and at least one other component. For example, as one embodiment of the water purification material, a water purifier filter in which the above heavy metal adsorbent is mixed in an activated carbon filter. Regarding the detail of the water purification material, a known technique relating to water purification materials including zeolite may be applied.

[Manufacturing Method of Heavy Metal Adsorbent]

One aspect of the present invention relates to a method of manufacturing the above heavy metal adsorbent. The above manufacturing method includes adding a silicon-containing compound X and an aluminum-containing compound Y to a zeolite seed crystal-containing slurry A at a temperature in the range of 60° C. to 200° C. Furthermore, the addition of X satisfies the following (1), and the addition of Y satisfies the following (2).

(1) The total addition amount of X is an amount such that the silicon element amount in X is 3.5 or more times amount of the silicon element amount in the zeolite seed crystals on a molar basis, and the addition amount of X per hour is 5.00 mol or less based on the silicon element amount in X with respect to 1 mol amount of silicon elements in the zeolite seed crystals.

(2) The total addition amount of Y is an amount such that the aluminum element amount in Y is 3.5 or more times amount of the aluminum element amount in the zeolite seed crystals on a molar basis, and the addition amount of Y per hour is 5.00 mol or less based on the aluminum element amount in Y with respect to 1 mol amount of aluminum elements in the zeolite seed crystals.

Hereinafter, the above manufacturing method will be described in more detail.

<Slurry A>

The slurry A contains zeolite seed crystals. The zeolite seed crystals may be synthetic zeolites or natural zeolites, and may be at least one zeolite selected from synthetic zeolites and natural zeolites. Synthetic zeolites are preferable as the zeolite seed crystals because synthetic zeolites can be industrially manufactured and are normally highly pure. It is preferable that the skeleton structure of the zeolite seed crystals is the same as the skeleton structure of zeolite of a target to be manufactured because the production of byproducts other than target zeolite can be suppressed. For example, it is preferable to use Type-A zeolite as seed crystals for manufacturing Type-A zeolite and to use Type-X zeolite as seed crystals for manufacturing Type-X zeolite. Slurry is a mixture of liquid and solid, and the slurry A at least contains zeolite seed crystals as the solid. It is preferred that the liquid in the slurry A contains water, and it is more preferred that the liquid is water.

As optional components that can be included in the slurry A, at least one alkali metal compound may be mentioned. It is preferable that the slurry A contains an alkali metal compound from the viewpoint of facilitating the manufacture of a zeolite. As the alkali metal compound, an alkali metal compound normally used to manufacture zeolites can be used without any limitation. Preferable examples of alkali metal compounds include sodium hydroxide (also referred to as "caustic soda"), potassium hydroxide, and the like. As the alkali metal compounds, one of them may be used singly, and two or more of them may be used in combination in any proportions.

The content of liquid (preferably water) in the slurry A and the content of alkali metal compounds that may be optionally included may be set according to the type of target zeolite. For example, when water is used as the liquid and a sodium-containing compound is used as an alkali metal compound for manufacturing zeolite, these contents can be preferably set, as appropriate, in the range of molar ratios listed in Table 2 as listed below. All amounts of the liquid (preferably water) used to manufacture a zeolite may be included in the slurry A, and part or all of the liquid may be added simultaneously with the addition of a silicon-containing compound X and an aluminum-containing compound Y. Regarding the addition of the liquid (preferably water), the amount of addition per hour does not need to be strictly controlled, unlike the addition of the silicon-containing compound X and the addition of the aluminum-containing compound Y which will be described later. These also apply to the case where an alkali metal compound is used to manufacture a zeolite.

The addition of a silicon-containing compound X and an aluminum-containing compound Y to the slurry A is performed while the temperature of the slurry A is controlled in the range of 60° C. to 200° C. 60° C. to 200° C. is the crystallization temperature of zeolite. The temperature of the slurry A may be set according to the type of target zeolite. The temperature of the slurry A may be kept constant or changed in the range described above when the silicon-containing compound X and the aluminum-containing compound Y are being added. The temperature of the slurry A may be controlled by known temperature-controlling means, such as a heater. It is preferable to stir the slurry A when the silicon-containing compound X and the aluminum-containing compound Y are being added to the slurry A because the contact efficiency between the zeolite seed crystals and other raw materials increases. Stirring can be performed using means normally used to manufacture zeolites, for example, a propeller stirrer such as a three-one motor.

<Silicon-Containing Compound X>

As the silicon-containing compound X, a silicon-containing compound normally used to manufacture zeolites may be used without any limitation. Preferable examples of silicon-containing compounds include sodium silicate (also referred to as "soda silicate" or "water glass"), potassium silicate, colloidal silica, silica powder, and the like. As the silicon-containing compounds, one of them may be used singly, or two or more of them may be used in combination in any proportions.

<Aluminum-Containing Compound Y>

As the aluminum-containing compound Y, an aluminum-containing compound normally used to manufacture zeolites may be used without any limitation. Preferable examples of aluminum-containing compounds include aluminum hydroxide, sodium aluminate (also called "soda aluminate"), alumina gel, and the like. As the aluminum-containing compounds, one of them may be used singly, or two or more of them may be used in combination in any proportions.

<Total Amount of Raw Materials Used>

The amounts used of the liquid (preferably water), the silicon-containing compound X, the aluminum-containing compound Y, and optional alkali metal compounds, which are raw materials other than zeolite seed crystals, can be set according to the type of the target zeolite. For example, when water is used as liquid and a sodium-containing compound is used as an alkali metal compound to manufacture a zeolite, the amounts can be preferably set, as appropriate, in the range of molar ratios listed in Table 2 below. In Table 2, preferred ranges are listed in parentheses. Components derived from zeolite seed crystals are not considered for calculating the molar ratios listed in Table 2. That is, the sodium content in the sodium-containing compound shall be calculated as a value in terms of $Na_2O$, the silicon content in the silicon-containing compound X shall be calculated in terms of $SiO_2$, and the aluminum content in the aluminum-containing compound Y shall be calculated in terms of $Al_2O_3$. Calculations from each element content in each raw material can determine each converted value.

TABLE 2

| | Target zeolite | | | |
|---|---|---|---|---|
| Molar ratio | Type A | Type X | Type Y | Type P |
| $Na_2O/SiO_2$ | 0.5 to 3.0 | 0.3 to 4.0 | 0.2 to 1.5 | 0.2 to 8.0 |
| | (0.7 to 1.5) | (0.7 to 3.2) | (0.4 to 0.8) | (0.4 to 2.0) |
| $SiO_2/Al_2O_3$ | 0.2 to 4.0 | 1.5 to 10.8 | 2.5 to 20.0 | 3.0 to 20.0 |
| | (1.2 to 3.0) | (2.0 to 6.0) | (4.0 to 9.0) | (4.0 to 10.0) |
| $H_2O/Na_2O$ | 15 to 200 | 15 to 70 | 25 to 75 | 20 to 200 |
| | (30 to 80) | (25 to 50) | (35 to 60) | (30 to 100) |

<Addition of Silicon-containing Compound X and Aluminum-containing Compound Y to Slurry A>

The addition of the silicon-containing compound X and the addition of the aluminum-containing compound Y to the slurry A are performed simultaneously or in any order. The silicon-containing compound X may be added to the slurry A in a state of liquid or solid as it is or may be added to the slurry A as a solution of a mixture of a silicon-containing compound X and a solvent. The aluminum-containing compound Y may also be added to the slurry A in a state of liquid or solid as it is or may be added to the slurry A as a solution of a mixture of an aluminum-containing compound Y and a solvent.

When the silicon-containing compound X and the aluminum-containing compound Y are added simultaneously, the silicon-containing compound X and the aluminum-containing compound Y may be mixed before the addition to the slurry A or may be added separately without mixing before the addition to the slurry A. For example, a solution (for example, an aqueous solution) containing a silicon-containing compound X and an aluminum-containing compound Y may be prepared, and this solution may be added to the slurry A. Meanwhile, when the silicon-containing compound X and the aluminum-containing compound Y are added sequentially, the addition of either one may be started first, and the addition of either one may be completed first. During the addition of one of them, the addition of the other may be started, and after the addition of one of them is completed, the addition of the other may be started.

The silicon-containing compound X is added to the slurry A so as to satisfy the following (1), and the aluminum-containing compound Y is added to the slurry A so as to satisfy the following (2). The addition so as to satisfy the following (1) and (2) is preferred for preparing zeolite with a median diameter in the range described above and a pore volume in the range described above.

(1) The total addition amount of X is an amount such that the silicon element amount in X is 3.5 or more times amount of the silicon element amount in the zeolite seed crystals on a molar basis (the ratio of silicon element amount in X to that in the zeolite seed crystals is also referred to as "X(Si)/A(Si)"), and the addition amount of X per hour (also referred to as the "X(Si) addition amount per hour") is mol or less based on the silicon element amount in X with respect to 1 mol amount of silicon elements in the zeolite seed crystals.

(2) The total addition amount of Y is an amount such that the aluminum element amount in Y is 3.5 times or more the aluminum element amount in the zeolite seed crystals on a molar basis (the ratio of aluminum element amount in Y to that in the zeolite seed crystals is also referred to as "Y(Al)/A(Al)"), and the addition amount of Y per hour (also referred to as the "Y(Al) addition amount per hour") is mol or less based on the aluminum element amount in Y with respect to 1 mol amount of aluminum elements in the zeolite seed crystals.

Regarding the addition of the silicon-containing compound X, the "X(Si)/A(Si)" is 3.5 or more times amount, preferably 3.7 or more times amount, and more preferably 4.0 or more times amount. The upper limit of the "X(Si)/A(Si)" is not particularly limited. As the value of the "X(Si)/A(Si)" is larger, the manufacturing time is longer, and the manufacturing cost increases. Thus, in consideration of the manufacturing time and the manufacturing cost, the "X(Si)/A(Si)" is preferably 15.0 or less times amount, and more preferably, in this order, 14.0 or less times amount, 13.0 or less times amount, and 12.0 or less times amount.

The silicon-containing compound X is added such that the total addition amount is 3.5 or more times amount as the "(X(Si)/A(Si))" and the "X(Si) addition amount per hour" is 5.00 mol or less based on the silicon element amount in X with respect to 1 mol amount of silicon elements in the zeolite seed crystals.

The silicon-containing compound X may be added to the slurry A at a constant addition rate during the addition or a varying rate during the addition, as long as the "X(Si) addition amount per hour" is 5.00 mol or less. In addition, the addition may be continued without suspending the addition within a period from the start of addition to the completion of the addition of the total addition amount of X or may include a period where the addition is suspended.

When the addition of the total addition amount of X is completed in one hour or more than one hour from the start of addition, the time at which the addition is started is taken as the $T_{start}$, the time at which the addition of the total addition amount of X has been completed is taken as $T_{end}$, and the amount of X (based on the silicon element amount in X with respect to 1 mol amount of the silicon element in the zeolite seed crystals) added within any one hour between the $T_{start}$ and the $T_{end}$ is taken as an "X(Si) addition amount per hour". The "any one hour" may only be a period during which the addition is being performed, may include the period during which the addition is suspended and the period during which the addition is being performed, or may only be the period during which the addition is suspended. As one example, when the addition of the total addition amount of X is completed 80 minutes later from the start of addition, the "any one hour" may be, for example, a period from the start of addition (0 minutes) to 60 minutes later from the start of addition, or a period from 10 to 70 minutes later from the start of addition, or a period from 20 to 80 minutes later from the start of addition. When the addition of the total amount of X is completed in one hour or more than one hour from the start of addition, the "X(Si) addition amount per hour is 5.00 mol or less" used in the present invention and the present description shall mean that the amount of X (based on the silicon element amount in X with respect to 1 mol amount of the silicon element in the zeolite seed crystals) added in any one hour starting at any point between the start of addition to the completion of addition is 5.00 mol or less.

Meanwhile, when the addition of the total addition amount of X is completed in T minutes that is less than one hour from the start of addition (that is, the "T minutes" is less than 60 minutes), the "X(Si) addition amount per hour is 5.00 mol or less" used in the present invention and the present description shall mean that, when the total amount of X added in T minutes is taken as x mol (based on the silicon element amount in X with respect to 1 mol amount of the silicon element in the zeolite seed crystals), a value calculated by "x×60/T" is 5.00 mol or less. For example, when the addition of the total addition amount of X is completed in 30 minutes from the start of addition and 2.00 mol (based on the silicon element amount in X with respect to 1 mol amount of the silicon element in the zeolite seed crystals) of X is added within this 30 minutes, "x×60/30" is "2.00×60/30"=4.00 mol, and the X(Si) addition amount per hour is 4.00 mol. The "T minutes" described above may only be a period during which the addition is being performed or may include the period during which the addition is suspended and the period during which the addition is being performed.

The addition amount of X(Si) per hour is 5.00 mol or less, preferably 4.50 mol or less, and more preferably 4.00 mol or less. When the addition of the total addition amount of X is completed in one hour or more than one hour from the start of addition, the X(Si) addition amount per hour is 0 mol when the whole of the one hour is an addition-suspended period, or may be, for example, 0.10 mol or more or 0.50 mol or more when part or whole of the one hour is an addition-implemented period. Meanwhile, when the addition of the total addition amount of X is completed within less than one hour from the start of addition, the X(Si) addition amount per hour may be, for example, 0.10 mol or more or 0.50 mol or more.

Regarding the addition of the aluminum-containing compound Y, the "Y(Al)/A(Al)" is 3.5 or more times amount and preferably 3.7 or more times amount. In addition, the upper limit of the "Y(Al)/A(Al)" is not particularly limited. As the value of the "Y(Al)/A(Al)" is larger, the manufacturing time is longer, and the manufacturing cost increases. Thus, in consideration of the manufacturing time and the manufacturing cost, the "Y(Al)/A(Al)" is preferably 12.0 or less times amount, and more preferably 11.0 or less times amount, 10.0 or less times amount, and 9.0 or less times amount in this order.

The aluminum-containing compound Y is added such that the total addition amount is 3.5 or more times amount as the "(Y(Al)/A(Al))", and the addition amount of Y per hour (also referred to as the "Y(Al) addition amount per hour") is 5.00 mol or less based on the aluminum element amount in Y with respect to 1 mol amount of aluminum elements in the zeolite seed crystals.

The aluminum-containing compound Y may be added to the slurry A at a constant addition rate during the addition or a varying rate during the addition, as long as the "Y(Al) addition amount per hour" is 5.00 mol or less. In addition, the addition may be continued without suspending the addition during a period from the start of addition to the completion of the addition of the total addition amount of Y or may include a period where the addition is suspended.

When the addition of the total amount of Y is completed in one hour or more than one hour from the start of addition, the time at which the addition is started is taken as the $T_{start}$, the time at which the addition of the total addition amount of Y has been completed is taken as $T_{end}$, and the amount of Y (based on the aluminum element amount in Y with respect to 1 mol amount of the aluminum element the in zeolite seed crystals) added within any one hour between the $T_{start}$ and the $T_{end}$ is taken as a "Y(Al) addition amount per hour". The "any one hour" may only be a period during which the addition is being performed, may include the period during which the addition is suspended and the period during which the addition is being performed, or may only be the period during which the addition is suspended. As one example, when the addition of the total addition amount of Y is completed 80 minutes later from the start of addition, the "any one hour" may be, for example, a period from the start of addition (0 minutes) to 60 minutes later from the start of addition, or a period from 10 to 70 minutes later from the start of addition, or a period from 20 to 80 minutes later from the start of addition. When the addition of the total addition amount of Y is completed in one hour or more than one hour from the start of addition, the "Y(Al) addition amount per hour is 5.00 mol or less" used in the present invention and the present description shall mean that the amount of Y (based on the aluminum element amount in Y with respect to 1 mol amount of the aluminum element in the zeolite seed crystals) added in any one hour starting at any point between the start of addition to the completion of addition is 5.00 mol or less. Meanwhile, when the addition of the total addition amount of Y is completed in T minutes that is less than one hour from the start of addition (that is, the "T minutes" is less than 60 minutes), the "Y(Al) addition amount per hour is 5.00 mol or less" used in the present invention and the present description shall mean that, when the total amount of Y added in T minutes is taken as y mol (based on the aluminum element amount in Y with respect to 1 mol amount of the aluminum element in the zeolite seed crystals), a value calculated by "y×60/T" is 5.00 mol or less. For example, when the total addition amount of Y is completed in 30 minutes from the start of addition, and 2.00 mol (based on the aluminum element amount in Y with respect to 1 mol amount of the aluminum element in the zeolite seed crystals) of Y is added in this 30 minutes, "y×60/30" is "2.00×60/30"=4.00 mol, and the Y(Al) addition amount per hour is 4.00 mol. The "T minutes" described above may only be a period during which the addition is being performed or may include the period during which the addition is suspended and the period during which the addition is being performed.

The Y(Al) addition amount per hour is 5.00 mol or less, preferably 4.50 mol or less, more preferably 4.00 mol or less, and further preferably 3.50 mol or less. When the addition of the total addition amount of Y is completed in one hour or more than one hour from the start of addition, the Y(Al) addition amount per hour is 0 mol when the whole of the one hour is an addition-suspended period, or may be, for example, 0.10 mol or more or 0.50 mol or more when part or whole of the one hour is an addition-implemented period. Meanwhile, when the addition of the total addition amount of Y is completed within less than one hour from the start of addition, the Y(Al) addition amount per hour may be, for example, 0.10 mol or more or 0.50 mol or more.

After the addition of X and Y to the slurry A, a known post-treatment may be performed according to need, whereby a target zeolite can be obtained. For example, after the completion of the addition of X and Y to the slurry A, solid-liquid separation and water washing are performed, and drying is further performed to prepare the target zeolite. The resulting zeolite may be a particulate matter, that is, zeolite particles. It is preferable to further keep the liquid temperature of a resulting mixture after the completion of the addition of X and Y to the slurry A to a temperature at which crystallization of zeolite occurs since the crystallinity of the resulting zeolite can be increased. The keeping time is not particularly limited and can be set, as appropriate, according to the type of target zeolite and the liquid temperature of the mixture and may generally be in the range of 30 minutes to 24 hours.

EXAMPLES

The present invention will be further described with reference to Examples. However, the present invention is not limited to the embodiments shown in the Examples.

Example 1

<Preparation of Slurry A>

As zeolite seed crystals, 70 g of Type-X zeolite (manufactured by Sinanen Zeomic Co., Ltd., silicon element content: 17.7 mass %, aluminum element content: 15.1 mass %) was dispersed in 2468 g of water, and then 357 g of 48 mass % sodium hydroxide solution (manufactured by Tokuyama Corporation, sodium content (in terms of $Na_2O$): 37.2 mass %) was added to prepare a slurry A.

<Addition of X, Y and Synthesis of Zeolite>

No. 3 soda silicate (manufactured by Fuji Chemical Co., Ltd., silicon content (in terms of $SiO_2$): 29.1 mass %, sodium content (in terms of $Na_2O$): 9.4 mass %) was used as a silicon element-containing compound X, and soda aluminate (manufactured by Asada Chemical Industry Co., Ltd., aluminum content (in terms of $Al_2O_3$): 19 mass %, sodium content (in terms of $Na_2O$): 19.5 mass %) was used as an aluminum element-containing compound Y.

To a slurry A heated at 90° C. ("addition temperature" in Table 3) on a hotplate, soda silicate and soda aluminate were simultaneously added to a slurry A using separate metering pumps under the addition condition listed in Table 3 (addition-suspended period: none, addition rate during addition: constant). During the addition, the slurry A was stirred by a three-one motor, and the temperature of the slurry A was kept at the addition temperature (90° C.). The addition of soda silicate and the addition of soda aluminate were simultaneously finished at the time when the total addition amount of soda silicate reached an amount listed in Table 3 indicated as "(X(Si)/A(Si))" and the total addition amount of soda aluminate reached the amount listed in Table 3 indicated as "(Y(Al)/A(Al))". After the addition, the liquid temperature of the mixture was kept at the addition temperature (90° C.) for one hour, then the mixture was filtrated and washed with water, and further dried to produce zeolite particles.

Examples 2 to 5

Zeolite particles were prepared by the method described in Example 1, except that the items listed in Table 3 were changed as listed in Table 3.

Example 6

Zeolite particles were prepared by the method described in Example 1, except that the slurry A prepared by the method described below was used as the slurry A, and the items listed in Table 3 were changed as listed in Table 3.

<Preparation of Slurry A>

As zeolite seed crystals, 63 g of Type-P zeolite (manufactured by Sinanen Zeomic Co., Ltd., silicon element content: 20.8 mass %, aluminum element content: 12.4 mass %) was dispersed in 1732 g of water, and then 75 g of 48 mass % sodium hydroxide solution was added to prepare slurry A.

Example 7

Zeolite particles were prepared by the method described in Example 1, except that the slurry A prepared by the method described below was used as the slurry A, and the items listed in Table 3 were changed as listed in Table 3.

<Preparation of Slurry A>

As zeolite seed crystals, 129 g of Type-A zeolite (manufactured by Sinanen Zeomic Co., Ltd., silicon element content: 15.6 mass %, aluminum element content: 15.4 mass

Comparative Examples 2 to 4

Zeolite particles were prepared by the method described in Example 1, except that the items listed in Table 3 were changed as listed in Table 3.

X-ray diffraction analysis of zeolite particles obtained in each of Examples 1 to 8 and Comparative Examples 1 to 4 revealed that the zeolite particles were zeolites of the types listed in Table 3.

TABLE 3

|  | Type of Zeolite seed crystals | Type of resulting zeolite | Addition amount of X(Si) per hour [mol] | Addition amount of Y(Al) per hour [mol] | X(Si)/A(Si) [Times amount] | Y(Al)/A(Al) [Times amount] | Addition temperature |
|---|---|---|---|---|---|---|---|
| Example 1 | Type X | Type X | 1.59 | 1.27 | 7.9 | 6.4 | 90° C. |
| Example 2 | Type X | Type X | 1.59 | 1.27 | 4.8 | 3.8 | 90° C. |
| Example 3 | Type X | Type X | 3.97 | 3.18 | 7.9 | 6.4 | 90° C. |
| Example 4 | Type X | Type X | 1.59 | 1.27 | 11.1 | 8.9 | 90° C. |
| Example 5 | Type X | Type X | 0.79 | 0.64 | 7.9 | 6.4 | 70° C. |
| Example 6 | Type P | Type P | 2.45 | 1.57 | 9.8 | 6.3 | 95° C. |
| Example 7 | Type A | Type A | 0.93 | 0.91 | 3.7 | 3.6 | 85° C. |
| Example 8 | Type X | Type X | First addition period: 3.18 Second addition period: 1.59 | First addition period: 2.54 Second addition period: 1.27 | 7.9 | 6.4 | 90° C. |
| Comparative Example 1 | No seed crystal | Type X | — | — | — | — | 90° C. |
| Comparative Example 2 | Type X | Type X | 0.98 | 0.71 | 3.4 | 2.5 | 90° C. |
| Comparative Example 3 | Type X | Type X | 1.59 | 1.27 | 7.9 | 6.4 | 40° C. |
| Comparative Example 4 | Type X | Type X | 7.94 | 6.35 | 7.9 | 6.4 | 90° C. |

%) was dispersed in 1197 g of water, and then 2619 g of 48 mass % sodium hydroxide solution was added to prepare a slurry A.

Example 8

Zeolite particles were prepared by the method described in Example 1, except that the items listed in Table 3 were changed as listed in Table 3, and the addition of soda silicate and soda aluminate was performed at a constant addition rate within a period from the start of addition to one hour later from the start of addition (first addition period), the addition was thereafter suspended for one hour, and then the addition was performed at a constant addition rate for another one hour (second addition period).

Comparative Example 1

Zeolite particles were prepared by the method described in Example 1, except that the amount of the zeolite seed crystals was 0 g. Regarding X and Y, the addition rate and total addition amount thereof were set to be the same as in Example 1. However, since zeolite seed crystals were not used in Comparative Example 1, the addition rate and the total addition amount listed in Table 3 calculated based on the silicon element amount or aluminum element amount in zeolite seed crystals in the slurry A cannot be calculated for Comparative Example 1.

Comparative Example 5

Type-X zeolite using a binder was granulated by the method described below. Type-X zeolite particles (manufactured by Sinanen Zeomic Co., Ltd., particle size: 3 µm), 600 g, were dispersed in 1063 g of water, and 333 g of colloidal silica (SNOWTEX ST-30, manufactured by Nissan Chemical Corporation) was further added as a binder component to prepare a slurry C. The resulting slurry C was spray-granulated using a spray dryer (model: L-8, manufactured by Ohkawara Kakoki Co., Ltd.) to prepare a granulated zeolite.

Comparative Example 6

Binderless Type-X zeolite was prepared by the method described below.

The granulated zeolite prepared in Comparative Example 5, 50 g, was added to a plastic container containing 6 g of sodium aluminate powder (manufactured by Kishida Chemical Co., Ltd.), 58 g of 48 mass % sodium hydroxide solution, and 175 g of water, and the resulting mixture was heated at a liquid temperature of 85° C. for 17 hours under a static condition to prepare binderless zeolite in which a binder component in zeolite particles was converted into zeolites.

Comparative Example 7

A pulverized material of a commercially available binderless Type-X zeolite was prepared by the method described below.

Commercially available binderless Type-X zeolite granulated product (ZCI 10-22, manufactured by Z-Chemicals Inc.) was coarsely pulverized to prepare zeolite particles with a particle size of about 45 to 150 μm using 100-mesh and 300-mesh sieves.

[Evaluation Method]

<Median diameter, Pore Volume, and Median diameter Reduction Rate>

Regarding Examples 1 to 7 and Comparative Examples 1 to 7, median diameters, pore volumes, and median diameter reduction rates were determined by the abovementioned method. Table 4 shows the results.

<Determination of Aluminum Amount>

The aluminum amount of each of Examples 1 to 8 and Comparative Examples 1 to 7 was determined by the method described below. Table 4 shows the results. As indicated in Table 4, the aluminum amounts in Examples 1 to 7 were found to be smaller than in Comparative Examples 1 to 7. Such results indicate that particle disintegration due to contact with water is suppressed in zeolite particles of Examples 1 to 7.

Zeolite particles, 5 g, and activated carbon (manufactured by Kowa Kagaku Kogyo K.K.), 50 g, were mixed using a mixer. The resulting mixture was put in a beaker containing 300 ml of simulated tap water (leachate specified in JIS S 3200-7:2010: pH 7.0±0.1, hardness 45±5 mg/L, alkalinity 35±5 mg/L, residual chlorine 0.3 mg±0.1 mg/L) and stirred with a propeller stirrer for 24 hours. After 24 hours, the resulting mixture was subjected to solid-liquid separation using Advantec No. 5A filter paper (pore size: 7 μm), and the aluminum content in the filtrate was determined by atomic absorption spectrometry to calculate the concentration (unit: ppb (on a mass basis)). Table 4 shows the results.

<Heavy Metal Adsorption Test 1>

Lead adsorption test was performed on Examples and Comparative Example listed in Table 5 by the method described below. Table 5 shows the results.

In a polypropylene container, 50 mg of an adsorbent (zeolite particles) was weighed, 500 ml of simulated tap water containing 10000 ppb (on a mass basis) of lead ions was added thereto, and the mixture was stirred for 24 hours using a propeller stirrer (number of revolutions: 150 rpm) (adsorption process).

After the 24-hour stirring, the resulting mixture was subjected to solid-liquid separation using a membrane filter (pore size: 0.45 μm), and the lead ion concentration in the separated liquid was measured by an atomic absorption spectrophotometer. Lead removal rates were determined according to the expression described below.

Lead removal rate (%)=(($a-b$)/$a$)×100(%)

a: Lead ion concentration before the addition of an adsorbent (10000 ppb)
b: Lead ion concentration after adding an adsorbent and stirring for 24 hours (adsorption process)

<Heavy Metal Adsorption Test 2>

In a polypropylene container, 50 mg of an adsorbent in Example 1 (zeolite particles) was weighed, 500 ml of simulated tap water containing 2500 ppb (on a mass basis) of any one of copper ions, zinc ions, or cadmium ions was added thereto, and the mixture was stirred for 24 hours using a propeller stirrer (number of revolutions: 150 rpm) (adsorption process).

After 24-hour stirring, the resulting mixture was subjected to solid-liquid separation using a membrane filter (pore size: 0.45 μm), and the concentration of copper ions, zinc ions, or cadmium ions in the separated liquid was measured by an atomic absorption spectrophotometer. Removal rates were determined according to the expression described below. Table 6 shows the results.

Removal rate (%)=(($a-b$)/$a$)×100(%)

a: Metal ion concentration before the addition of an adsorbent (2500 ppb)
b: Metal ion concentration after adding an adsorbent and stirring for 24 hours (adsorption process)

As widely known, zeolite has a function that adsorbs various heavy metals. Accordingly, it goes without saying that Examples other than the Examples, the test results of which are listed in Tables 5 and 6, have heavy metal adsorption abilities, similarly.

TABLE 4

| | Median diameter [μm] | Pore volume Calculation range: 10 nm to 1000 nm [cm³/g] | A value [μm] | B value [μm] | Median diameter Reduction rate [%] | Aluminum amount [ppb] |
|---|---|---|---|---|---|---|
| Example 1 | 27.9 | 0.0047 | 27.9 | 26.7 | 4.3 | 30 |
| Example 2 | 22.3 | 0.0437 | 24.8 | 20.2 | 18.5 | 40 |
| Example 3 | 24.9 | 0.0190 | 25.5 | 22.1 | 13.3 | 25 |
| Example 4 | 50.3 | 0.0069 | 52.1 | 46.7 | 10.4 | 31 |
| Example 5 | 29.2 | 0.0080 | 29.5 | 25.3 | 14.2 | 89 |
| Example 6 | 35.3 | 0.0031 | 36.1 | 34.9 | 3.3 | 27 |
| Example 7 | 54.2 | 0.0135 | 58.5 | 51.1 | 12.6 | 59 |
| Example 8 | 26.5 | 0.0053 | 27.3 | 25.5 | 6.6 | 35 |
| Comparative Example 1 | 3.9 | 0.1863 | 8.9 | 3.2 | 64.0 | 839 |
| Comparative Example 2 | 15.4 | 0.1110 | 23.9 | 7.9 | 66.9 | 450 |
| Comparative Example 3 | 9.3 | 0.2981 | 15.3 | 8.6 | 43.8 | 637 |
| Comparative Example 4 | 11.5 | 0.1451 | 19.3 | 7.8 | 59.5 | 346 |
| Comparative Example 5 | 52.5 | 0.1748 | 111.0 | 6.2 | 94.4 | 520 |
| Comparative Example 6 | 33.3 | 0.3869 | 44.5 | 17.7 | 60.2 | 257 |
| Comparative Example 7 | 41.6 | 0.4435 | 44.0 | 10.2 | 76.8 | 340 |

TABLE 5

| | Lead ion concentration after adsorption process (ppb) | Lead removal rate (%) |
|---|---|---|
| Example 1 | 5 | 99.95 |
| Example 3 | 2 | 99.98 |
| Example 6 | 10 | 99.90 |
| Comparative Example 1 | 5 | 99.95 |
| Example 7 | 15 | 99.85 |

TABLE 6

| | Copper ion | | Zinc ion | | Cadmium ion | |
|---|---|---|---|---|---|---|
| | Concentration after adsorption process (ppb) | Removal rate (%) | Concentration after adsorption process (ppb) | Removal rate (%) | Concentration after adsorption process (ppb) | Removal rate (%) |
| Example 1 | 5 | 99.80 | 20 | 99.20 | 1 | 99.96 |

One aspect of the present invention is useful in various water purification fields such as tap water purification.

The invention claimed is:

1. A method of manufacturing a heavy metal adsorbent consisting of a zeolite with a median diameter on a volume basis of 10.0 μm or more and a pore volume measured in a pore volume calculation range of 10 nm to 1000 nm by a mercury intrusion method of 0.1000 cm³/g or less,
which comprises:
adding a silicon-containing compound X and an aluminum-containing compound Y to a zeolite seed crystal-containing slurry A at a temperature of 60° C. to 200° C. simultaneously or in any order,
wherein
the addition of X satisfies the following (1), and the addition of Y satisfies the following (2):
(1) a total addition amount of X is an amount such that a silicon element amount in X is 3.5 or more times amount of a silicon element amount in the zeolite seed crystals on a molar basis, and
an addition amount of X per hour is 5.00 mol or less based on the silicon element amount in X with respect to 1 mol amount of silicon elements in the zeolite seed crystals; and
(2) a total addition amount of Y is an amount such that an aluminum element amount in Y is 3.5 or more times amount of an aluminum element amount in the zeolite seed crystals on a molar basis, and
an addition amount of Y per hour is 5.00 mol or less based on the aluminum element amount in Y with respect to 1 mol amount of aluminum elements in the zeolite seed crystals.

2. The method of manufacturing a heavy metal adsorbent according to claim 1,
wherein a median diameter reduction rate of the zeolite after 600-second ultrasonication at an output of 40 W is 20% or less.

3. The method of manufacturing a heavy metal adsorbent according to claim 1,
wherein the median diameter of the zeolite is 20.0 μm or more and 50.0 μm or less.

4. The method of manufacturing a heavy metal adsorbent according to claim 1,
wherein the pore volume of the zeolite is 0.0200 cm³/g or less.

5. The method of manufacturing a heavy metal adsorbent according to claim 1,
wherein the zeolite is selected from the group consisting of Type-A zeolite, Type-X zeolite, Type-Y zeolite, and Type-P zeolite.

6. The method of manufacturing a heavy metal adsorbent according to claim 1,
wherein the zeolite is Type-X zeolite.

7. The method of manufacturing a heavy metal adsorbent according to claim 1,
wherein the heavy metal is at least one heavy metal selected from the group consisting of lead, copper, zinc, and cadmium.

8. The method of manufacturing a heavy metal adsorbent according to claim 1,
wherein a median diameter reduction rate of the zeolite after 600-second ultrasonication at an output of 40 W is 20% or less,
the median diameter of the zeolite is 20.0 μM or more and 50.0 μM or less,
the pore volume of the zeolite is 0.0200 cm³/g or less,
the zeolite is Type-X zeolite, and
the heavy metal is at least one heavy metal selected from the group consisting of lead, copper, zinc, and cadmium.

* * * * *